(12) United States Patent
Asbridge

(10) Patent No.: US 8,065,133 B1
(45) Date of Patent: Nov. 22, 2011

(54) METHOD FOR TESTING A STORAGE NETWORK INCLUDING PORT LEVEL DATA HANDLING

(75) Inventor: B. Vincent Asbridge, Worcester, MA (US)

(73) Assignee: Sanblaze Technology, Inc., Maynard, MA (US)

( * ) Notice: Subject to any disclaimer, the term of this patent is extended or adjusted under 35 U.S.C. 154(b) by 1257 days.

(21) Appl. No.: 11/479,433

(22) Filed: Jun. 30, 2006

(51) Int. Cl.
G06F 9/455 (2006.01)
(52) U.S. Cl. .......................................... 703/23
(58) Field of Classification Search .................. 703/23; 709/201, 203, 212, 213, 232
See application file for complete search history.

(56) References Cited

U.S. PATENT DOCUMENTS

| | | | |
|---|---|---|---|
| 5,388,060 | A | 2/1995 | Adams |
| 6,738,937 | B1 | 5/2004 | Bergsten |
| 6,766,466 | B1 | 7/2004 | Jibbe |
| 6,766,520 | B1 * | 7/2004 | Rieschl et al. ............... 719/321 |
| 7,020,600 | B2 | 3/2006 | Deao |
| 2003/0179777 | A1 | 9/2003 | Denton |
| 2004/0193397 | A1 | 9/2004 | Lumb |
| 2004/0267516 | A1 | 12/2004 | Jibbe |
| 2004/0268200 | A1 | 12/2004 | Mak |
| 2006/0010233 | A1 | 1/2006 | Fellenstein |
| 2006/0123189 | A1 * | 6/2006 | Bitner et al. ............... 711/111 |
| 2007/0088795 | A1 * | 4/2007 | Dunbar ............... 709/217 |
| 2009/0172326 | A1 * | 7/2009 | Sandorfi ............... 711/162 |
| 2009/0216910 | A1 * | 8/2009 | Duchesneau ............... 709/250 |
| 2009/0290595 | A1 * | 11/2009 | Celebioglu et al. ............... 370/419 |

OTHER PUBLICATIONS

Agilent Technologies, "Agilent Technologies'storage areas network tester software provides breakthrough in test scalability through device virtualization", Press Release, Oct. 15, 2003, Agilent Technologies, Inc., Palo Alto, CA.
D. Johnson, "Bus emulation drives production testing", Test & Measurement World, vol. 15, No. 2 , pp. 41-48 , Feb. 1995, Cahners Publishing, USA.

* cited by examiner

*Primary Examiner* — Paul Rodriguez
*Assistant Examiner* — Andre Pierre Louis
(74) *Attorney, Agent, or Firm* — Clock Tower Law Group; Erik J. Heels; Michael A. Bartley (57) ABSTRACT

The invention is a method of testing a storage network that includes a method of handling data at the port and bus level. The method includes emulating targets in computer memory, receiving data from initiators, and passing to computer memory only a portion of the data received. Bandwidth of internal memory and paths to memory are de-coupled from devices under test attached to ports, such that full bandwidth testing is possible at all test clients simultaneously. Data passed on a wire is returned or discarded at the port or bus level. The invention is useful for testing networks that have high bandwidths, and for testing large storage area networks.

16 Claims, 7 Drawing Sheets

METHOD FOR TESTING A STORAGE NETWORK INCLUDING PORT LEVEL DATA HANDLING

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2006 SANBlaze Technology, Inc.

CROSS REFERENCE TO RELATED APPLICATIONS

None.

BACKGROUND OF THE INVENTION

The invention relates to target emulation technologies. More specifically, the invention relates to target emulation and testing storage area networks in a multi-port testing environment.

"SCSI" (Small Computer System Interface) is an industry standard for connecting peripheral devices and their controllers to an initiator (n.wikipedia.org/wiki/SCSI). A SCSI device is usually a peripheral (for example, a hard disk drive) that responds to an operation requested by a SCSI "initiator," which is usually the host system. SCSI peripherals are "targets," but for some commands, the SCSI peripheral may need to act temporarily as an initiator.

"Fibre Channel" is another industry standard (n.wikipedia.org/wiki/Fibre_channel). Logically, the "Fibre Channel" is a bidirectional, full-duplex, point-to-point, serial data channel structured for high performance data communication. Physically, the Fibre Channel is an interconnection of multiple communication ports interconnected by 1) a switching network (a "fabric"), 2) a point-to-point link, or 3) an arbitrated loop. Fibre Channel is a generalized transport mechanism that has no protocol of its own or native input/output command set but can transport any existing Upper Level Protocols ("ULPs)" such as Asynchronous Transfer Mode ("ATM"), Internet Protocol ("IP"), and SCSI. Commonly, Fibre Channel refers to a serial computer bus intended for connecting high speed SCSI storage devices to computers in a Storage Area Network ("SAN").

A Logical Unit Number ("LUN") is a SCSI identifier within a target assigned to each Fibre Channel accessible disk that allows the host system to address and access data on the target devices. One physical SCSI hard disk drive can be subdivided into multiple LUNs.

The most common way to test Fibre Channel devices, and other network devices, that address multiple disk drives is to create a test environment that contains multiple physical disk drives. For example, if a lab needed to test a Fibre Channel device that claimed to be able to address a varying amount of disk drives, each with different parameters, the lab's test engineers would need to physically assemble a large number of disk drives or "scratch disks" for use in testing. Furthermore, to determine how the device would react to adverse conditions such as bad drives, labs would maintain some set of faulty disk drives to enable this level of testing to occur. Such an environment is expensive and time-consuming to set up.

There have been some attempts to solve the problem of providing an environment for testing disk drives in a storage area network. Fibre Channel bus analyzer products, if properly programmed, can emulate a single drive. Other software products can serve virtual disks intended for permanent data storage.

There are several problems with these approaches. One problem is time and money. Setting aside a large amount of Fibre Channel disk drives for testing and development purposes can cost a significant amount of money. Configuring these resources into different configurations to allow for testing of multiple scenarios takes lab time and effort. Physically connecting and changing drive configurations can quickly take considerable time and resources of lab personnel.

Another problem is the lack of reliable error and fault testing. With physical disks, it is difficult to find and keep an inventory of "bad" drives with predictable behavior and then configuring them into test systems. Yet it is important for device vendors to be able to test their devices against disks with known bad conditions. The ability to inject specific types of disk errors into a test environment is missing in the prior art.

Another problem is the lack of controllable environment variables. For example, to test a device, a tester may want to test 40 disk drives, then 20 minutes later have 10 of the disks fail or go away, then 5 minutes later add the disks back into the test. This example could represent a situation where power is lost to the 10 drives and later restored.

A solution to these problems is a storage emulation device for testing a network. The emulation device emulates disk drives (external devices) for read/write performance testing environments and requires no initiator-side software changes. For the testing embodiment, the system reduces the need to deploy large amounts of expensive physical "scratch" disks by providing high performance, non-volatile, virtual disk media. The software includes predefined tests for performance, stability, MaxLUN, exception, and read/write/fault insertion allowing a Fibre Channel device to be tested as if the device were attached to a large array of physical disks. A web-based graphical user interface (GUI) allows a tester to configure, reconfigure, inject errors, and monitor from a remote client computer. The emulation device can be a rack-mounted unit that has ports for connecting to a storage area network, random access memory for storing emulated target disk drives, and a processor.

In a test environment, to test the bandwidth of an external device, such as a fibre-channel switch, it is necessary to send and receive real data through the switch at full bandwidth on every port. But when operating in a large SAN with multiple clients connected to multiple ports, or at high network bandwidths, a bottleneck exists when moving data from wire to RAM, due to the aggregation of bandwidths as data moves closer to memory. This is especially true when a test is designed to run each port at its maximum bandwidth. A storage emulation device allows passing of data only to the limit of the ability of the test system's internal data bus to move data to memory or storage.

Data bus bandwidth is a problem when testing large storage area networks. For example, if a storage emulation device can receive data on 12 wires with each wire having a bandwidth of 400 MB/sec, then the total throughput is 4.8 GB/sec. This is a problem if a storage emulation device bandwidth is considerably less than 4.8 GB/sec. Such a device is not useful for organizations with a large SAN and that transmit enormous amounts of data.

BRIEF SUMMARY OF THE INVENTION

In a SAN test environment with multiple ports connected to multiple clients, data passed on a wire can be identified as a repeated pattern instead of "real" data. The invention is a method to source and sink the pattern without passing all of the data to host memory. When data enters the disk emulation device, the data is returned or redirected at the bus and port level-letting only a fraction of a percent of the data be directly transferred to a local piece of memory. Thus most of the data never reaches a CPU, of the device, and is discarded. This method applied to a storage emulation device is good for performance testing and error injection. This method has a distinct advantage of being able to operate wires independently of one another, allowing a test system that scales to 12, 24 and more ports. Variations of the method allow read only testing, write only testing and write/read/compare testing.

The invention allows the "short circuit" of test data at the port interface on the test system, such that the full bandwidth of a switch can be verified without the limitation of the test system. This method, or device mode, can be used on either end of the transfer, or both. All statistical information and information relevant to the operation of the client or the target is allowed to pass normally to system memory. Test data, or scratch data, is short circuited, allowing for seamless integration into standard read/write testing protocols.

In the preferred embodiment, multiple storage or network or other I/O devices are tested simultaneously, with the data from the test devices arriving at system memory. When the performance bandwidth of system memory is reached, no additional test devices can be added to the system without a reduction in performance to any one device. In the method of the invention, the bandwidth of the internal memory and paths to memory become de-coupled from the devices under test, attached to the ports, such that full bandwidth testing can be accomplished at all test clients simultaneously.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION OF THE INVENTION, INCLUDING THE PREFERRED EMBODIMENT

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Terminology

The terminology and definitions of prior art are not necessarily consistent with the terminology and definitions of the current invention. Where there is a conflict, the following definitions apply.

Bandwidth—A measure of capacity or transmission rate. The amount of information or data that can be sent over a network connection or along a channel in a given period of time. Bandwidth is usually expressed in megabits per second (mps), kilobits per second (kbps), or bits per second (bps).

Client—a computer system, device, application or program that accesses or requests a service on another computer, server, or storage device by some kind of network.

Envelope data—Meta data associated with a packet or group of data. Envelope data can included statistical data Initiator—Any device, system, application or program that sends a command to a target or other device, system, application or program. Usually the device that sends a command or makes application requests is contained within a server. In another example, a SCSI device (initiator) requests another SCSI device (a target) to perform an operation. Usually a host computer acts as an initiator and a peripheral device acts as a target, but either can send or initiate commands.

Payload data—This is the content portion of a packet of group of data. It is generally exclusive of framing, header and meta data. Payload data is generally one or more orders of magnitude greater than envelope data (x10, x100, etc.).

Port—An interface through which data is sent and received.

Scratch data—Test data. Scratch data is usually valid only during the duration of testing and is not preserved.

Target—Any device, system, application or program that interprets, rejects, or satisfies, and replies to requests received from an initiator or client, or that receives data from an initiator. A target is also a SCSI device that performs an operation requested by an initiator.

Operation

Figure 1:
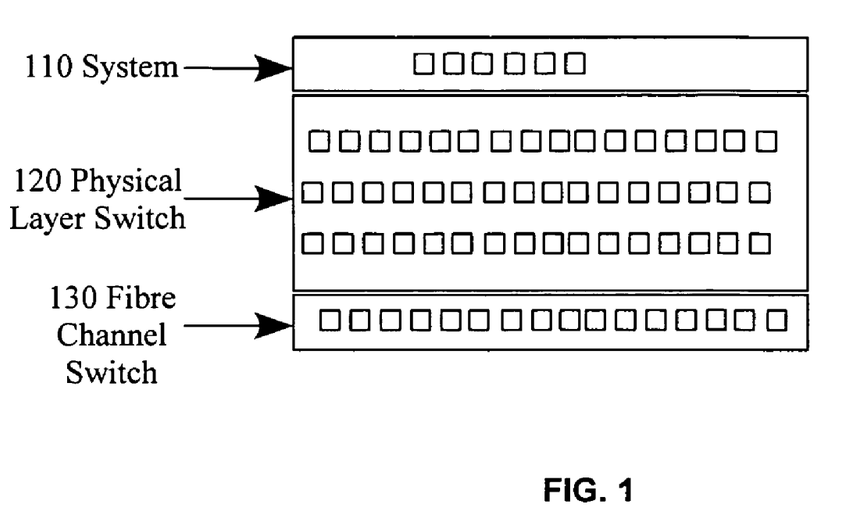
FIG. 1 is a schematic of the system in a SAN environment.

In the preferred embodiment, a storage emulation system is implemented as a combination of hardware and software as a one-unit (1U) rack-mounted computer system ("computer system" or "system"). FIG. 1 is a schematic of the system in a SAN environment. The system 110 is designed to be installed in a SAN environment close to a network patch panel or physical layer switch 120 so that it can be connected to an existing SAN (not shown) via a Fibre Channel switch 130. The ports in FIG. 1 are exemplary and do not represent the actual system ports. Actual ports include Fibre Channel ports, Ethernet RJ-45 ports (for FTP, telnet, and HTTP access), DB-9 serial connector (for terminal access), and any other industry port.

Figure 2:
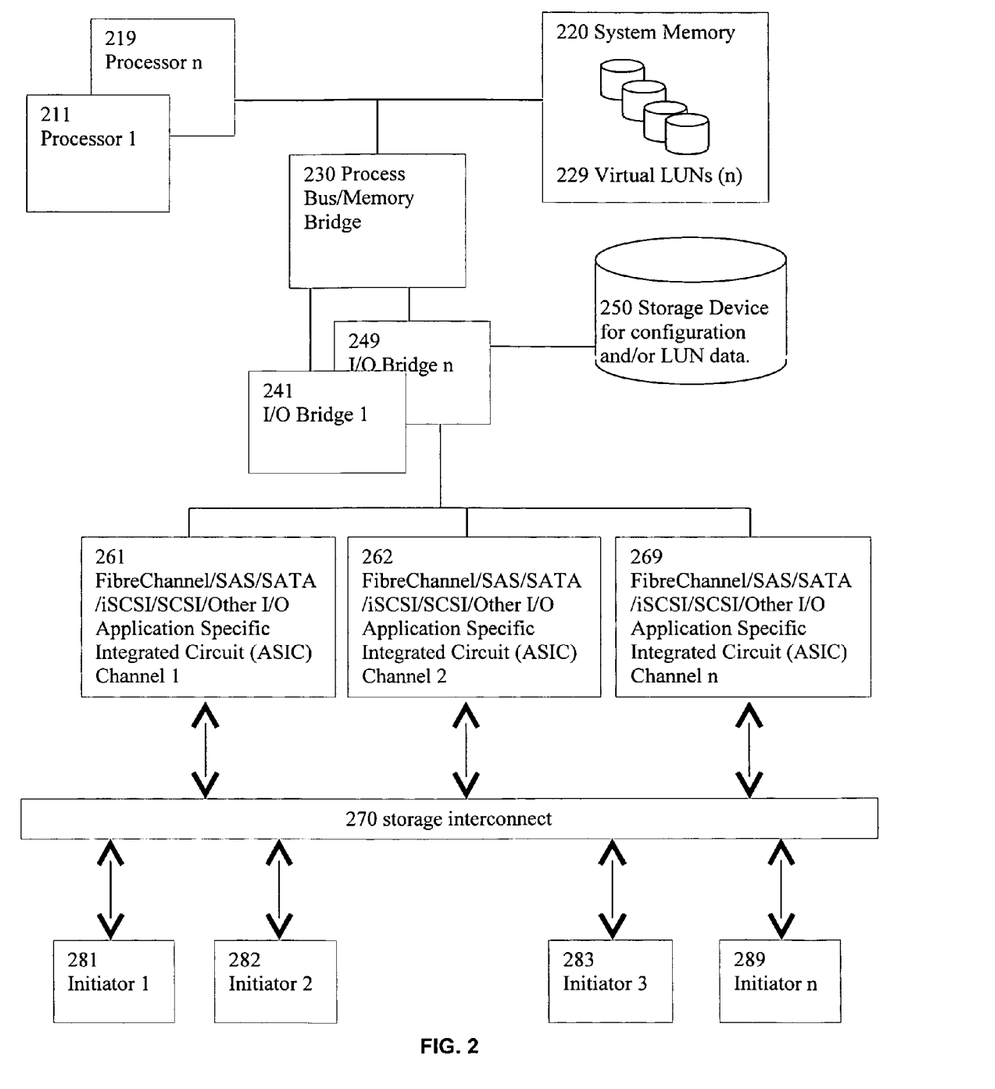
FIG. 2 is a high-level diagram of the system.

FIG. 2 is a high-level diagram of the system. In the system 110, multiple processors (processor 1 211 and processor n 219 are shown) connect to system memory 220, which are RAM storage devices. LUNs are created in system memory 220 (RAM) as virtual LUNs 229. Since RAM has faster access times than disk-based media, virtual LUNs provide the maximum possible performance with the lowest possible latency. LUNs can be used as "scratch disks" for testing or for other applications that require a rapidly accessible copy of data (including, but not limited to, video files, database, trade show demonstrations).

Continuing with FIG. 2. Multiple I/O controllers (I/O controller 261 for channel 1, I/O controller 262 for channel 2, and I/O controller 269 for channel n are shown) store and retrieve data to and from virtual LUNs 229 via DMA (Direct Memory Access; i.e. without subjecting processors 211-219 to an interrupt load) by way of multiple I/O bridges (I/O bridge 1 241 and I/O bridge n 249 are shown) and process bus/memory bridge 230, thereby providing the maximum possible bandwidth while allowing for real writes and reads to support data integrity testing. I/O controllers 261-269 operate independently of each other such that activity on one will not adversely affect activity on another. I/O controllers 261-269 are modular and interchangeable allowing support for multiple storage protocols (including, but not limited to, Fibre Channel, SAS, SATA, iSCSI, and SCSI) without changing the system hardware and software.

Continuing with FIG. 2. Multiple external initiators (initiator 1 281, initiator 2 282, initiator 3 283, and initiator n 289 are shown) connect via storage interconnect 270 to I/O controllers 261-269, thereby setting up external initiators 281-289 for testing by the system. In the preferred embodiment, storage interconnect 270 is Fibre Channel but can be one of multiple physical bus architectures (including, but not limited to, Fibre Channel, SAS, SATA, iSCSI, and SCSI). Virtual LUNs 229 appear as physical disk drives to initiators 281-289, and have identical characteristics over multiple physical bus architectures (including, but not limited to, Fibre Channel, SAS, SATA, iSCSI, and SCSI).

Continuing with FIG. 2. The multiple I/O bridges 241-249 interconnect with storage device 250. During operation of the system, LUN data is stored and retrieved to and from virtual LUNs 229 in system memory 220 (RAM). LUN data can also be saved to permanent storage in storage device 250 (e.g. as a database on a physical hard disk drive) such that test configurations can be re-created when needed. In addition to LUN data, storage device 250 also stores configuration data, including:
1) system configuration data;
2) port configuration data;
3) target configuration data;
4) LUN configuration data, the number and attributes of the virtual LUNs in each configuration; and
5) program configuration data, the tests created with the scripting language to run on each configuration.

The system saves configuration data to storage device 250 upon system shutdown so that the configuration data can be restored on re-start.

Figure 3A:
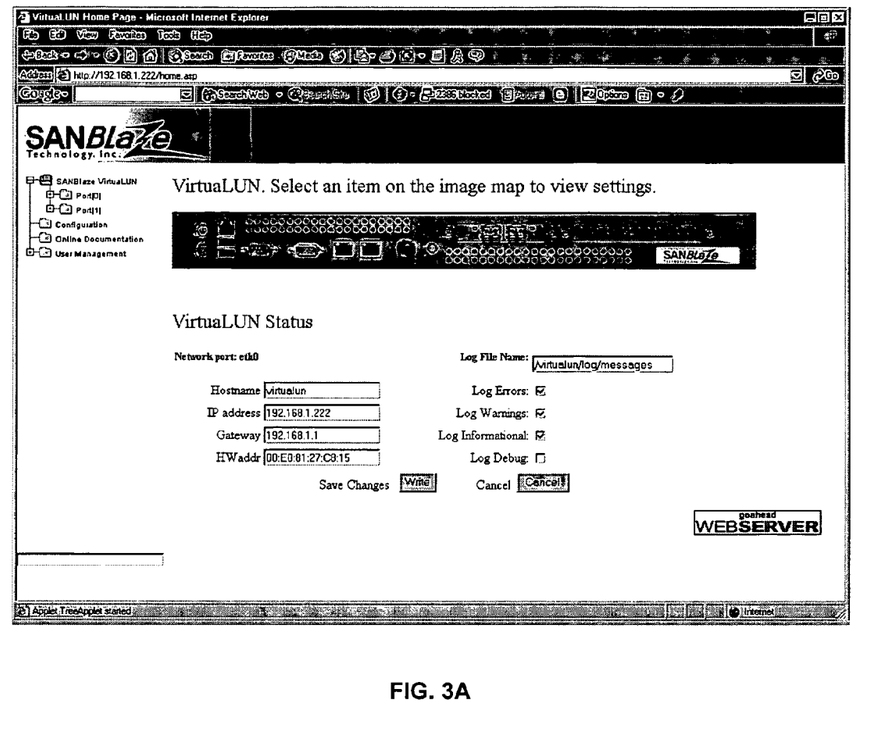
FIG. 3A is a screen-shot of the home page of the system's graphical user interface as viewed from a web browser.

FIG. 3A is a screen-shot of the home page of the system's graphical user interface as viewed from a web browser. From the home page, a user can change system configuration data including hostname, IP address, gateway, hardware (MAC) address, log file pathname/filename, and log error reporting level (errors, warning, informational, and/or debug). The system can also be shutdown or restarted via the home page.

Figure 3B:
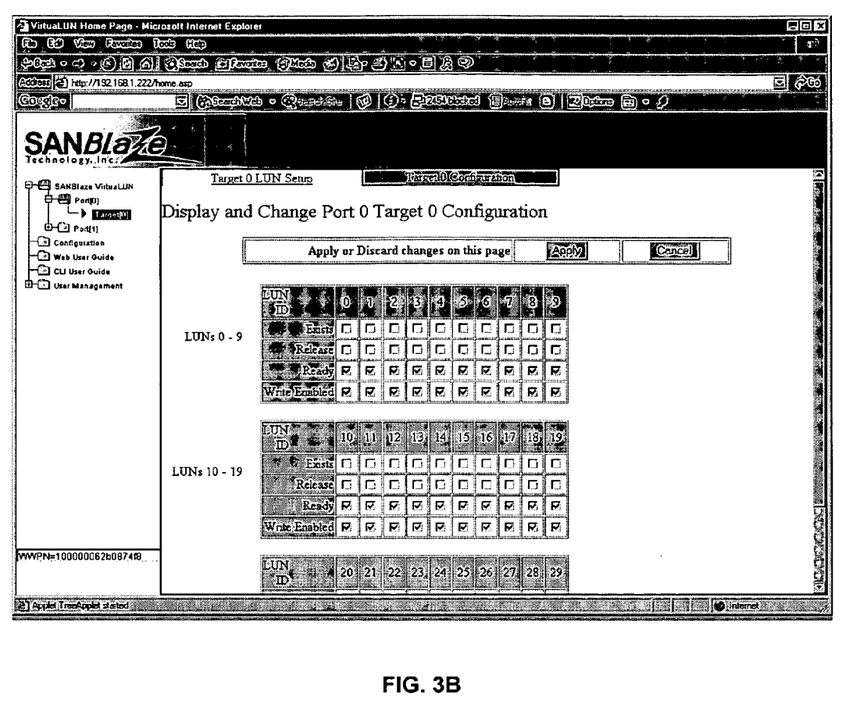
FIG. 3B is a screen shot of the target page of the system's graphical user interface as viewed from a web browser.

A menuing system provides access to other aspects of the system. The system is designed to have up to 6 ports, up to 16 targets per port, and up to 30 LUNs per target, for a total of 2880 LUNs per system. FIG. 3B is a screen shot of the target page of the system's graphical user interface as viewed from a web browser. From the target page, a user can change target configuration data, including binary values for each of the 30 LUNs in the target for 1) "LUN exists" status, 2) "release" status, 3) "ready" status, and 4) "write enabled" status.

Figure 3C:
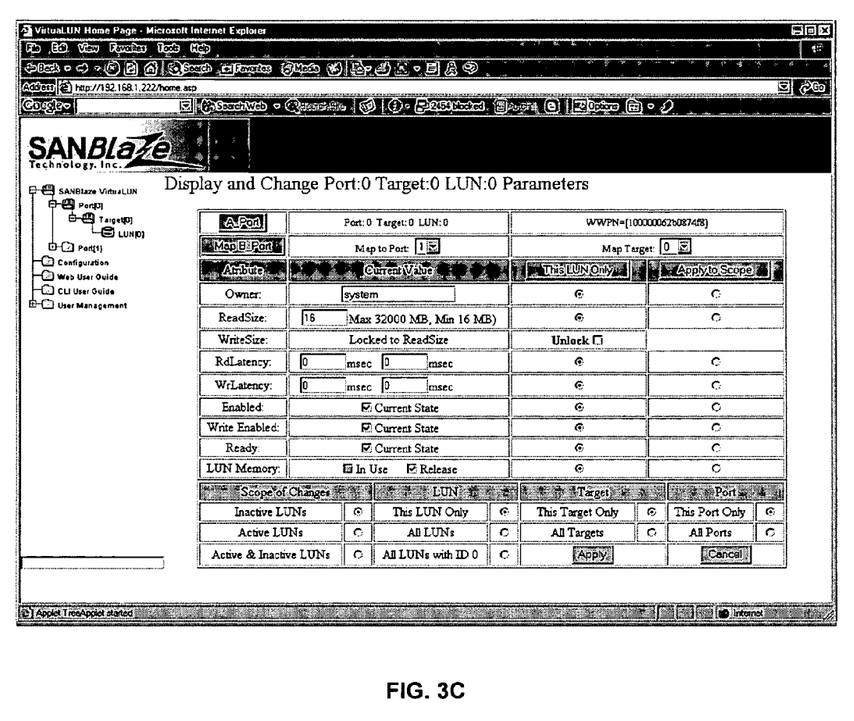
FIG. 3C is a screen shot of the LUN page of the system's graphical user interface as viewed from a web browser.

FIG. 3C is a screen shot of the LUN page of the system's graphical user interface as viewed from a web browser. From the LUN page, a user can change LUN configuration data, i.e. the LUN attributes.
1) The "enabled" attribute is a binary value that indicates whether a LUN is enabled.
2) The "write enabled" attribute is a binary value that indicates whether a LUN can be written to, and if this attribute is not enabled for the LUN, then the LUN will respond to a write request from an initiator with a "write protect" status message.
3) The "ready" attribute is a binary value that indicates whether a LUN is ready, and if this attribute is not enabled for the LUN, then the LUN will respond to a "Test Unit Ready" command with a "Not Ready" status message.

Continuing with FIG. 3C. Another LUN attribute is multi-port mapping. The system allows two ports to be "mapped" such that LUNs over the two ports appear as the "A" port and "B" port of a single dual-ported LUN. This feature is specifically designed for use in fail-over testing in multi-path environments. To map an A-port/B-port disk, a user would first turn on the "enabled" attribute for a LUN and then, from the LUN page, select the "Map B_Port" button. Mapped LUNs share a physical memory structure such that changes made to the configuration of either port will be reflected in both ports. Likewise, "writes" to port A are available as "reads" on port B and vice versa. Once multi-port mapping is set up, a user can conduct fail-over testing via the command line interface (CLI).

Continuing with FIG. 3C. Other LUN attributes are the "read size" and the "write size." A physical 16 MB hard disk drive has a read size of 16 MB and a write size of 16 MB. Virtual LUNs can vary the read size and write size for each emulated hard disk drive. Since virtual LUNs are created in system memory (RAM), the combination of the read sizes of all of the virtual LUNs cannot exceed the physical system memory on the system. From the LUN page, a user can set the read size for a LUN from a minimum value of 16 MB, and a user can set the maximum value to 32,000 MB (32 GB) or the total amount of system memory, whichever is greater. If a user attempts to set the maximum value to an amount greater than the total system memory, the system returns an error message.

The "write size" operates in two modes: "locked to read size" or "variable write size" (or "unlock"). In "locked to read size" mode, the write size is the same as the read size, and all write requests sent to the LUN are honored. The LUN will act in the same manner as a physical hard disk drive, with memory allocated for the entire size of the drive. Since virtual LUNs are created in system memory (RAM), the number of drives available for emulation is equal to the total system memory divided by the read size. In "variable write size" mode, the system allows for the LUN to have different read and write sizes. In this mode, a drive can be configured to be larger than the available system memory (RAM). This feature can be used to simulate very large drive farms in a test scenario where the data is not important. In this mode, the write size could be used to format the drives, for example. Reads within the write size area would return good data. Writes that are done beyond the configured area are discarded, and reads to that area return a status message indicating that the drive is in "variable write size" mode. If a drive is written beyond the configured write size (i.e. writes are being discarded), the system notifies the user (for example, by turning the drive icon red) so that the user can identify when they should not expect a data compare test to be successful.

Continuing with FIG. 3C, other LUN attributes are the "read latency" and the "write latency." The read latency is a number (indicated in milliseconds) that represents when the LUN will respond. The read latency can be set to a fixed number or a variable number within a range. To set read latency to a fixed latency, a user sets both "minimum read latency" and "maximum read latency" to the same desired latency. To set read latency to a variable latency, a user sets a "minimum read latency" and a larger "maximum read latency." Setting the minimum value greater than the maximum value results in an error. The variable latency that is introduced is a pseudo random number that is generated between the two values. This is useful in simulating the variable latency that one would experience with a physical hard disk drive. The "write latency" attribute works in the same manner as the "read latency" attribute.

LUN attributes can be set individually, at the LUN level, at the target level, or at the port level. At the LUN level, a user can apply a LUN's attributes to the LUN only, to all inactive LUNs, to all active LUNs, to all active and inactive LUNs, to all LUNs with the same ID as the current LUN, or to all LUNs. At the target level, a user can apply a LUN's attributes to the current target or to all targets. At the port level, a user can apply a LUN's attributes to the current port or to all ports.

Once a user has determined how many LUNs and targets to configure, and has chosen values for system configuration data, port configuration data, target configuration data, and LUN configuration data; program configuration data can be created in the form of scripts written in the system's scripting language and executable via the system's command line interface (CLI) or using a remote scripting language such as Expect (expect.nist.gov/). For example, to test a device, a user may want to test 40 disk drives, then 20 minutes later have 10 of the disks fail or go away, then 5 minutes later add the disks back into the test. This example could represent a situation where power is lost to the 10 drives and later restored. With the CLI-based scripting language, a user can create, change, and test scenarios such as this.

An extensible scripting interface is provided, commands can be executed locally on the system from the command line or remotely via network connection or "in-band" over the storage interconnect. Example commands, actions, and errors conditions include, but are not limited to, the examples shown below. To influence the behavior of a LUN, a user can echo keywords to the LUN control node.

| Commands | Notes |
|---|---|
| ReadSize = m | m = size in megabytes |
| WriteSize = m | m = size in megabytes |
| Owner = <string> | <string> = owner name |
| WriteProtect = d | d = flag (0 or 1), 0 = disable, 1 = enable |
| Exists = d | d = flag (0 or 1), 0 = disable, 1 = enable |
| Free = d | d = flag (0 or 1), 0 = disable, 1 = enable |
| Removable = d | d = flag (0 or 1), 0 = disable, 1 = enable |
| Locked = d | d = flag (0 or 1), 0 = disable, 1 = enable |
| NotReady = d | d = flag (0 or 1), 0 = disable, 1 = enable |

For example, to take a drive away (i.e. unplug it), the following command can be entered at the command line prompt (indicated by "#") or written in a script:
echo Exists=0>/port0/alias0lun0

| Actions and Error Conditions | Notes |
|---|---|
| Busy = d, c | d = number, c = I/O count |
| Drop = d, c | d = number, c = I/O count |
| QueueFull = d, c | d = number, c = I/O count |
| CheckCond = d, x, x, x, c | d = number, x = key, x = ASC, x = ASCQ, c = I/O count (d and x are hex values) |
| ReadUnder = d, c | d = number, c = I/O count |
| ReadOver = d, c | d = number, c = I/O count |
| WriteUnder = d, c | d = number, c = I/O count |
| WriteOver = d, c | d = number, c = I/O count |
| ReadDelay = x, y | x = min, y = max (if only x then set min and max to x) (x and y are in milliseconds) |
| WriteDelay = x, y | x = min, y = max (if only x then set min and max to x) (x and y are in milliseconds) |

To create a one-time busy event, the following command can be entered:
echo Busy=1,0>/port0/alias0lun0
To "busy" the next 5 commands, the following command can be entered:
echo Busy=5,0>/port0/alias0lun0

In a preferred storage emulation device,
1) the computing system is a one-unit (1U) rack-mounted computer system;
2) the CPUs are Intel microprocessors;
3) the operating system is the Mandrake 2.4 version of Linux;
4) the web server is the GoAhead (http://www.goahead.com/) embedded HTTP server;
5) the menuing system of the graphical user interface (GUI), is implemented in Sun's Java programming language for execution by client computers as a Java applet in the Java Virtual Machine (JVM) environment;
6) the emulation engine software is written in the C programming language.

This storage emulation system provides many features and advantages. A feature of the storage emulation system is large scale target emulation. The storage emulation system provides an all-in-one computer system for emulating thousands of disk drives. The advantage of this is that a test environment can be set up quickly with no need for installing or configuring software. Also, predefined tests (including performance, stability, MaxLUN, exception, and read/write/fault insertion) further reduce the time needed for setting up a test environment.

Another feature of the storage emulation system is rapid configuration and reconfiguration. A web-based user interface allows for rapid configuration and reconfiguration of test environments, and the changes can be presented onto the SAN in real time. Since the user interface is web-based, it can be accessed remotely over a network from a client computer equipped with a web browser. Error conditions can be inserted by users via the web-based user interface or can be programmed to be inserted based upon an event or occurrence.

Additionally, a scripting language allows testing to occur in a predetermined fashion based on events and/or triggers, thereby allowing the user to program and save various test scenarios, run the tests scenarios automatically, and repeat as needed without the need for user or physical intervention. A Command-Line Interface ("CLI") is also provided for the scripting language. The CLI can be accessed locally or remotely via a network.

Another feature of the storage emulation system is the ability to configure attributes of targets and LUNs. The number, size, and features of each emulated disk drive can be configured. LUN attributes that can be configured include, but are not limited to:
1) Variable disk size.
2) Variable write size.
3) Ability to appear as a "perfect" disk, indistinguishable to the initiator from a standard disk.
4) Ability to respond to any operation in error, either once, or multiple times.
5) Ability to change device identification information so as to emulate a specific device (e.g. a "Quantum disk drive") or a generic device.
6) Ability to appear as "removable."
7) Ability to appear as "write protected."
8) Ability to vary "latency" or read or write I/Os.
9) Dual port emulation (i.e. the same LUN can be presented on two (A and B) ports).

10) Automated fail-over and path redundancy testing using dual port feature.

Other features include:
1) Support for multiple ports.
2) Emulation of several physical Fibre Channel devices (world wide node name/world wide port names) per port.
3) Ability to inject "errors" on ports, by manual intervention or script, including, but not limited to, Loop initialization (LIP), Loop reset, Link disable (turn off light), Set link speed (or automatic), and Set link topology (or automatic).
4) Ability to monitor error counters and present results via a graphical user interface (GUI) or script.
5) Ability to emulate multiple storage protocols (including, but not limited to, Fibre Channel, SAS, SATA, iSCSI, and SCSI).

There are many other embodiments possible. For example: 1) the computer system may be implemented on one single physical computer, multiple computers, virtual computers, distributed computers, or any combination thereof and additional ports may be included; 2) the CPUs can be any microprocessor capable of controlling a general purpose computer; 3) the operating system can be Windows, Mac OS, Linux, UNIX, or any other operating system; 4) the web server can be any server capable of being a server for HTTP and other TCP/IP protocols (SHTTP, FTP, SCP, telnet, SSH). 5) the software (including the menuing system of the GUI and the emulation engine) may be written in one of several widely available programming languages, and the modules may be coded as subroutines, subsystems, or objects depending on the language chosen.

In other embodiments, emulation is provided for tape storage media, optical storage media, or environmental (e.g. temperature, humidity) monitors (SES). Pass-through emulation is provided, whereby the system passes data from an emulated disk drive to a physical storage device. Compatibility is provided for other protocols, including Serial Attached SCSI (SAS), iSCSI, SATA, 4 Gbps Fibre Channel, and 10 Gbps Fibre Channel.

The following two examples illustrate some of the ways to use the storage emulation device.

One example use is: New Product Development Testing iSCSI to Fibre Channel Bridge. If a developer needs a scalable and affordable environment for testing a new iSCSI to Fibre Channel bridge device ("test device") and desires to connect the test device to many different SAN/Fibre Channel configurations, then the storage emulation device can provide a system with virtual disks that can be used in place of multiple physical disk drives or arrays. Error conditions and different LUN counts can be simulated at wire speed to allow the tester to pinpoint problems with the test device and to provide a repeatable environment to test against.

There are several benefits in this example. The cost of setting up a test environment is a fraction of the cost of the physical disk systems needed to test real world environments. The test environment can be easily and quickly scaled to simulate a large number of scenarios and error conditions. Developers can quickly understand when, where, and why the test device began to experience problems. As a result, products can be debugged and launched to market sooner.

Another example use is: Infrastructure Testing and Troubleshooting Streaming Video System. If a streaming video editing system developer needs to troubleshoot two issues—the first, sporadic frame loss and jitter; the second, video dying after multiple hours of testing—then the invention can provide a system to replace physical disk arrays to allow developers to quickly simulate varying drive system characteristics.

There are several benefits in this example. A large number of disks can be emulated easily, thereby allowing for large systems testing at full speed without expensive physical infrastructure. The test environment can be quickly scaled to simulate a large number of scenarios and error conditions at full speed. As a result, the time needed to reconfigure test arrays is significantly less than would have been needed to build/configure and integrate multiple physical disk configurations, and the system's ability to run full speed testing decreases the mean time between errors from hours to minutes, which, in turn, significantly decreases troubleshooting time. As a result, products can be debugged and launched to market sooner.

Figure 4:
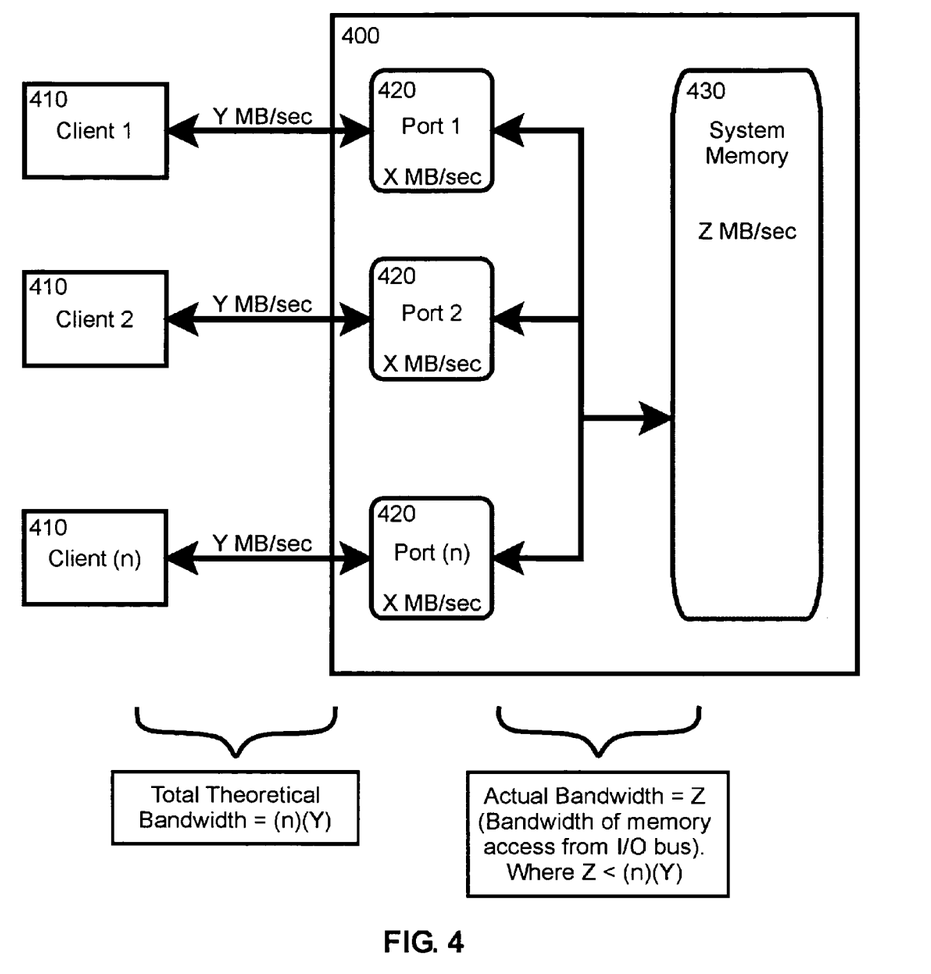
FIG. 4 illustrates an I/O bandwidth limitation in a storage emulation device.

FIG. 4 shows an I/O bandwidth limitation in a storage emulation device. Client 1 (410) through client (n) connect to storage emulation device 400 and ports 1 through port (n) (420). Each port can receive a maximum bandwidth of data represented by Y MB/sec. An actual internal bandwidth of storage emulation device 400 is the bandwidth of memory access of an I/O bus of the device. This actual bandwidth (Z MB/sec) is the bandwidth of data that storage emulation device 400 can move to system memory 430.

Figure 5:
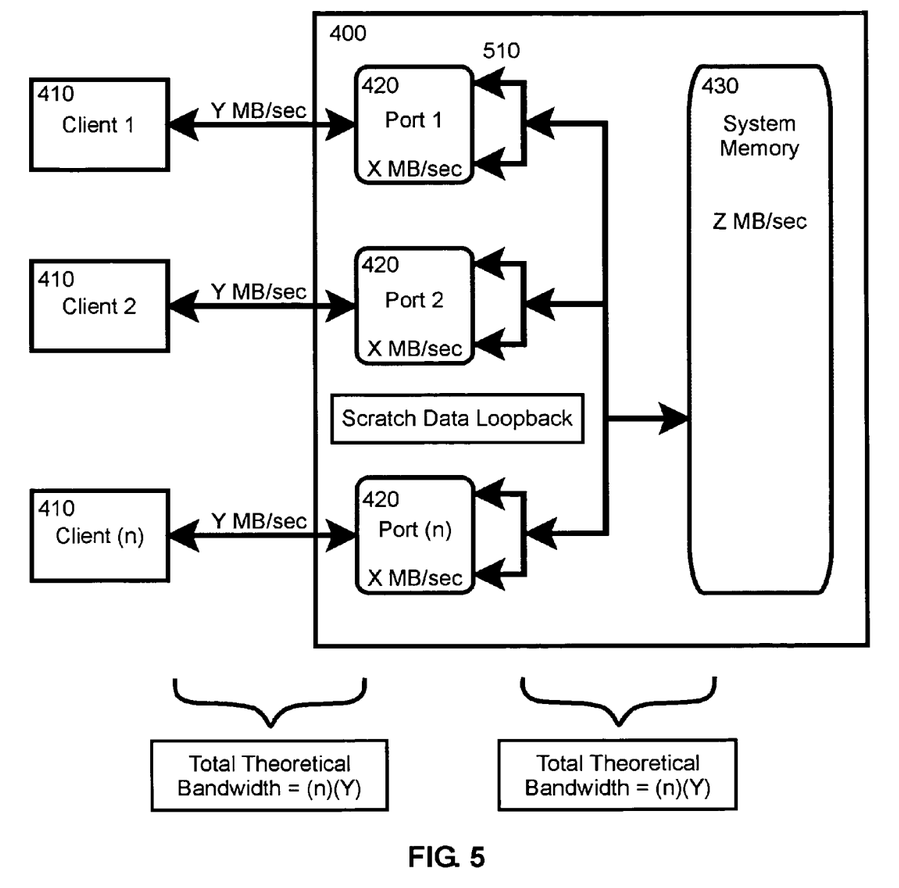
FIG. 5 illustrates no I/O bandwidth limitation in a storage emulation device.

FIG. 5 shows a storage emulation device configuration where there is no bandwidth limitation. Client 1 (410) through client (n) connect to storage emulation device 400 and ports 1 through port (n) (420). Each port can receive a maximum bandwidth of data represented by Y MB/sec. Data received at ports 420 is returned to clients—or discarded—at the port level as shown by arrows 510. Total theoretical internal bandwidth of storage emulation device 400 in this configuration is then equal to or greater than an aggregate bandwidth of ports 420.

Thus, the invention describes a method whereby data received from each of the clients is discarded at the receiving port while the envelope data is retained. As the payload data portion of the transfer becomes larger in relationship to the envelope, the majority of the bandwidth to system memory is maintained, as the data is never sent to system memory. The portion of data passed to system memory is small—preferably less than about 1%. This portion is often as low as 0.0001% of the total data. The portion can be as high as 16 bytes in 512 bytes, but it is typically 10 bytes in 256,000 bytes. This data can include statistical information about the real data being sent. Alternatively data sent to the test device is generated at the port, which avoids moving data over the system memory bus. With this invention, the majority of the data received never gets processed by the systems CPU. Read/write testing is limited in this mode. The advantage of this mode is that the device is easily scalable for performance testing—especially with large storage area networks.

Because the invention is intended to test the bandwidth of the client, the data sent to and from the client is considered scratch data and need not be preserved. Data generated at the port can be set to be all zero, all one, a pattern selected by the operator, or a random pattern generated by the hardware at the port device.

Outbound data is generated at the port by allocating an internal buffer within port hardware, and repeating that buffer n times in response to a request for data from the device. For example a buffer of 512 bytes is allocated in the internal port hardware, and sent four times in response to a request for 2048 bytes of data. The outbound buffer can be seeded with zero, one, or any other data pattern by the user.

Inbound data is simply discarded. When an inbound packet is received at port hardware, a bit is set indicating to port hardware that the data has been moved from the inbound buffer to the internal port RAM. No such move is actually made, and the data in the port RAM remains unchanged.

An actual move of the data to internal RAM is preferable over a move to system memory, but the port would be restricted to the bandwidth of the internal port RAM, and this would restrict the total bandwidth on any one port. All attributes of inbound and outbound I/O such that data is actually moved from the client to the port, and is measured for performance, errors, latency, and all other relevant parameters. I/Os that do not perform a data move (such as Inquiry) are moved untouched to system memory, such that a client system can do all operations such as bus scan.

No changes to the client side of the test device are required. An operating system or client hardware can use the invention unchanged. The invention can be (but is not required to be) implemented on both the "initiator (client)" and the "target (port)" side of the system. The invention can also be used to test video and network data.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

The invention claimed is:

1. A computerized method for emulating a target in a network for testing the network, the method comprising:
   emulating at least one target in a computer memory;
   maintaining a port for each emulated target, wherein each port receives data from at least one initiator to transfer to the at least one emulated target;
   receiving data from the at least one initiator, wherein the data is directed toward the at least one emulated target;
   wherein the received data has an aggregate bandwidth exceeding a maximum bandwidth capacity for transferring data between the ports and the at least one emulated target,
   wherein the data has a first portion and a second portion;
   passing to the computer memory, the first portion of the data received; and
   indicating to the port that all data, including data exceeding the maximum bandwidth capacity, has been successfully transferred.

2. The method of claim 1, further comprising discarding the second portion of the data.

3. The method of claim 1, further comprising returning the second portion of the data to the at least one initiator.

4. The method of claim 1, further comprising discarding the second portion of the data and returning, to the at least one initiator, a generated pattern of data of all ones, all zeroes, or a random pattern.

5. The method of claim 1, further comprising discarding the second portion of the data and returning scratch data to the at least one initiator.

6. The method of claim 1, wherein the first portion of the data is a smaller portion of the data than the second portion of the data.

7. The method of claim 1, wherein the first portion of the data includes statistical information.

8. The method of claim 1, wherein the first portion of the data includes information associated with operation of the at least one target.

9. The method of claim 1, wherein the first portion of the data includes information associated with operation of the at least one initiator.

10. The method of claim 1, further comprising running each port at a maximum bandwidth of each port.

11. A target emulation system for testing a network, the system comprising:
    a system memory,
    a processor component programmed to create, configure and emulate targets in the system memory;
    multiple ports for connecting clients to emulated targets;
    a system bus for transferring data from the multiple ports to the system memory;
    wherein the system bus has a maximum bandwidth less than a maximum aggregate bandwidth of data received at the ports; and
    wherein said system is programmed to redirect, at the port level, payload data received from clients, pass envelope data received from clients to the system memory, and indicate to the port that all data, including data exceeding the maximum bandwidth of the system bus, has been successfully transferred.

12. The system of claim 11, wherein redirecting payload data includes generating a data pattern of all ones, all zeroes, or a random pattern.

13. The system of claim 11, wherein the multiple ports operate independently, thereby providing port scalability.

14. The system of claim 11, further comprising measuring received and returned data for performance, errors, and latency.

15. The system of claim 11, wherein the emulated targets are emulated disk drives.

16. The system of claim 11, wherein redirecting further comprises discarding the payload data at the port level.

* * * * *